United States Patent
Graves et al.

(10) Patent No.: US 7,019,888 B1
(45) Date of Patent: Mar. 28, 2006

(54) DEFORMABLE MIRROR WITH PERIMETER WIRING

(75) Inventors: J. Elon Graves, Los Gatos, CA (US); Malcolm J. Northcott, Felton, CA (US); J. Christopher Shelton, Los Gatos, CA (US)

(73) Assignee: Aoptix Technologies, Campbell, CA (US)

( * ) Notice: Subject to any disclaimer, the term of this patent is extended or adjusted under 35 U.S.C. 154(b) by 0 days.

(21) Appl. No.: 10/688,087

(22) Filed: Oct. 16, 2003

Related U.S. Application Data

(60) Provisional application No. 60/419,777, filed on Oct. 17, 2002.

(51) Int. Cl.
*G02B 26/00* (2006.01)

(52) U.S. Cl. ...................... 359/295; 359/290; 359/291; 359/846

(58) Field of Classification Search ........ 359/290–295, 359/224, 838, 846, 847, 245, 247, 254, 263, 359/298, 223
See application file for complete search history.

(56) References Cited

U.S. PATENT DOCUMENTS

| | | | | |
|---|---|---|---|---|
| 5,745,278 A | * | 4/1998 | La Fiandra | 359/224 |
| 6,011,639 A | * | 1/2000 | LaFiandra | 359/224 |
| 6,464,364 B1 | * | 10/2002 | Graves et al. | 359/846 |
| 2002/0048096 A1 | * | 4/2002 | Melzer et al. | 359/846 |
| 2002/0131146 A1 | * | 9/2002 | Gee et al. | 359/291 |

\* cited by examiner

*Primary Examiner*—Hung Xuan Dang
*Assistant Examiner*—Joseph Martinez
(74) *Attorney, Agent, or Firm*—Fenwick & West LLP

(57) ABSTRACT

A deformable mirror for an adaptive optics system includes a number of electrodes for causing deformation of the mirror. An insulating layer and a layer of conductive traces over the electrodes allow the connection points for the electrodes to be moved to a perimeter region of the mirror, which facilitates connecting the mirror to a circuit board or other equipment. In one implementation, the deformable mirror is coupled to a circuit board by a strip connector (e.g., a zebra strip connector), which is maintained in a compressed state by a retaining plate.

28 Claims, 2 Drawing Sheets

DEFORMABLE MIRROR WITH PERIMETER WIRING

CROSS REFERENCE TO RELATED APPLICATIONS

This application claims the benefit of U.S. Provisional Application No. 60/419,777, filed Oct. 17, 2002, which is hereby incorporated in its entirety by reference.

BACKGROUND

1. Field of the Invention

This invention relates generally to deformable mirrors for an adaptive optics system, and in particular to coupling the deformable mirror to receive electric potential for causing deformations in the mirror.

2. Background of the Invention

There is an increasing interest in the use of free-space optical communications for various applications. For example, much of the current telecommunications infrastructure is based on the transmission of optical signals via optical fibers. While the use of fiber optics has increased the capacity and efficiency of data transmission, there are many situations where the installation of new fiber is not the best solution. As a result, there is interest in augmenting the telecommunications infrastructure by transmitting optical signals through the free-space of the atmosphere.

Free-space optical communications links can also be used advantageously in applications outside of the telecommunications infrastructure. Compared to other communications technologies, a free-space optical communications link can have advantages of higher mobility and compact size, better directionality (e.g., harder to intercept), faster set up and tear down, and/or suitability for situations where one or both transceivers are moving. Thus, free-space optical communications links can be used in many different scenarios, including in airborne, sea-based, space and/or terrestrial situations.

However, in many of these potential applications, the free-space optical communications link suffers from optical aberrations. For example, changes in atmospheric conditions can be a significant impediment to the accuracy, reliability and efficiency of free-space optical communications systems. Wind, heat waves, man-made pollutants and other effects can create constantly changing aberrations. This, in turn, can degrade the quality of the optical signal that is available at the receiver, resulting in degradation of the overall quality and efficiency of the communications channel.

To address the problem of optical aberrations, adaptive optics systems have been developed to compensate for these aberrations, thus improving the performance of free space optical communications systems. In addition to free-space optical communications, adaptive optics systems can be applied in other areas where optical aberrations are also problematic, such as for telescopes.

Some adaptive optics systems include a wavefront sensor, which senses the aberrations in the wavefront of light waves and provides a signal for correcting or compensating for those aberrations. Existing methods and devices for sensing and measuring the wavefront include several interferometric techniques, the Shack-Hartmann wavefront sensing techniques and various other systems that involve the projection of patterns of light through an optical system. Once the wavefront senor has measured these aberrations, it can provide a signal to a device for correcting the aberrations, such as a deformable mirror. By adaptively deforming to compensate for the measured aberrations in the light waves, the optical system can correct for these aberrations.

But these techniques and systems are typically complex and expensive and have various inherent deficiencies. In addition to the deficiencies of existing wavefront sensors, the deformable mirrors that are controlled by those wavefront sensors also have a number of deficiencies. One type of deformable mirror used is a stack actuator mirror. A stack actuator mirror include a number of push rods that engage the back of a flexible mirror so that the extension and retraction of each push rod causes an associated deformation in the mirror. These rods are controlled by the wavefront sensor, which effectively controls the deformation of the mirror.

The Shack-Hartman wavefront sensor measures local slopes of various points across a wavefront, and these slopes are provided to a wavefront reconstructor. The wavefront reconstructor matches the measured slopes to generate a continuous surface for the reconstructed wavefront. This type fitting is blind to hysterisis effects in the actuators, thereby causing a waffle pattern to appear on the mirror surface. Because the push rods tend to produce a deformation in the mirror that is nearly a straight line on the mirror surface between each pair of adjacent push rods, the push rods may do a poor job deforming the mirror in a curved pattern generated by the wavefront reconstructor, especially when a small number of actuators are used. Moreover, the number of push rods, the closeness of the push rods, and the length of their travel are physically limited. Since all actuators have the same travel and are attached to a rigid reference surface, the mirror has the same stroke for all modes (i.e., low order focus has the same stroke as the highest mode produced by every other actuator being turned on and off.) For correcting the aberrations originating in the atmosphere, this range of stroke at the highest modes is not necessary, and the corrections may not be accurate for small errors. Accordingly, the accuracy and degree of optical correction that can be applied by the stack actuator type mirror is limited.

One deformable mirror that overcomes many of these problems uses an electro-restrictive or piezoelectric material to deform the mirror in a controllable manner. Voltages are selectively applied to electrodes to deform the mirror. Connections to the individual electrodes are made by manually soldering wires to each electrode from. The wires couple the electrode to a printed circuit board, which provides voltages to the electrode for deforming the mirror. This method is difficult and time consuming, however, and can take hours to make the connections for a single mirror. Further, the connections can distort the mirror, the connected wires add mass to the mirror and therefore lower the resonant frequency of the mirror, and it is difficult to mass-produce wired mirrors using this method. Moreover, conductors carrying electricity in the same layer as the electrodes can cause an electric field that deforms the mirror in undesirable ways. Therefore, it is desirable to provide a better method for connecting the electrodes of the deformable mirror.

SUMMARY OF THE INVENTION

In an adaptive optics system, a deformable mirror having perimeter wiring avoids the deficiencies described above while maintaining reliable electrical connection with other components in the adaptive optics system. Rather than interface with associated equipment by directly connecting to the mirror's electrodes, the connection points for the electrodes are moved to a perimeter region of the deformable mirror. Therefore, the electrical connections with the mirror's electrodes are made outside a central area where the mirror is configured to receive and correct a light beam. In this way, connecting wires do not interfere electro-magnetically or mechanically with the operation of the mirror. Moreover, electrical connections can be made much more easily to locations on the perimeter of the mirror than at various locations in a central region of the mirror.

In one embodiment, an insulating layer and a layer of conductive traces over the electrodes allow the connection points for the electrodes to be moved to a perimeter region of the mirror. An adaptive optics system comprises a deformable mirror with a reflective surface and an electrode surface. The electrode surface of the mirror includes electrodes that cause the reflective surface to deform when an electric potential is applied to one of the electrodes. An insulating layer is formed on the electrode surface of the deformable mirror and exposes at least a portion of the electrodes. Conductive traces are formed on the insulating layer, electrically insulated from the electrodes, and each conductive trace couples an electrode to a perimeter region of the deformable mirror. In this way, electrical connection can be made to each of the electrodes by connecting to the perimeter of the mirror, rather than the central region where the mirror receives light beams.

In another aspect of the invention, the deformable mirror is electrically coupled to a circuit board, from which the mirror receives electric potentials for the mirror's electrodes. Taking advantage of the perimeter connectivity of the mirror, a strip connector includes a number of electrically isolated conductors for coupling conductors on the deformable mirror to their corresponding conductors on the circuit board. To maintain good electrical contact and to stabilize the mirror, a retaining plate mechanically couples the mirror to the circuit board.

In another embodiment of the invention, a method of manufacturing a deformable mirror includes masking an electrode pattern on a back surface of the deformable mirror and depositing a conductive layer on the back surface to form electrode segments thereon. With the electrode segments formed, an insulator pattern is masked over the electrode segments, and an insulating material is deposited over the electrode segments according to the insulator pattern. The insulator pattern exposes at least a portion of each electrode segment to allow making an electrical connection with each electrode segment. Then, a trace pattern is masked to define connections between the electrodes and a perimeter region of the deformable mirror, and a conductive material is deposited to form the conductive traces.

In addition to improving performance of the deformable mirror, moving the connections to the electrodes eliminates the labor-intensive soldering of wires to each electrode. This in turn enables larger scale manufacturing and reduces associated costs.

DETAILED DESCRIPTION OF THE PREFERRED EMBODIMENTS

The present invention provides improved connections to the electrodes of a deformable mirror. One type of deformable mirror used in adaptive optics includes a reflective surface, a number of internal layers, and a set of electrodes on an opposite surface. In one or more of its internal layers, the deformable mirror comprises an electro-restrictive material or some other mechanism that deforms the reflective surface responsive to receiving one or more electric voltage on the electrodes. A deformable mirror of this type is described in co-pending U.S. application Ser. No. 10/266, 981, filed Oct. 8, 2002, which is hereby incorporated in its entirety by reference.

Figure 1:
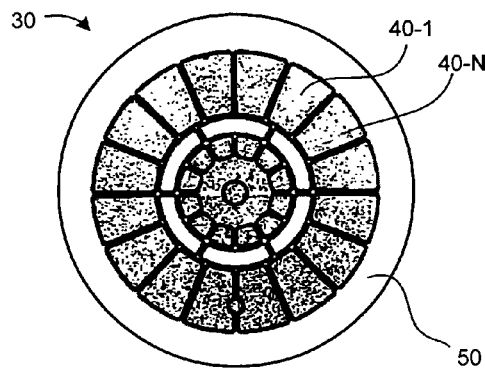
FIG. 1 is a diagram illustrating a mask for depositing a number of electrodes onto an electro-restrictive layer of a deformable mirror.

FIG. 1 illustrates a back surface 34 of a deformable mirror 30, which is opposite a reflective surface 32 of the mirror 30. In this example, the deformable mirror 30 is formed of an electro-restrictive material 50, such as PMN, which is configured to deform upon the application of an external electric field. In an alternate embodiment, a piezoelectric material, such as PZT, may be used instead. Returning to the example of FIG. 1, deposited on a layer of the electro-restrictive material 50 are N electrodes 40-1 through 40-N. An electric voltage can be applied to the mirror 30 at one or more of the electrodes 40, thereby selectively deforming the mirror 30 and its reflective surface 32.

Figure 3:
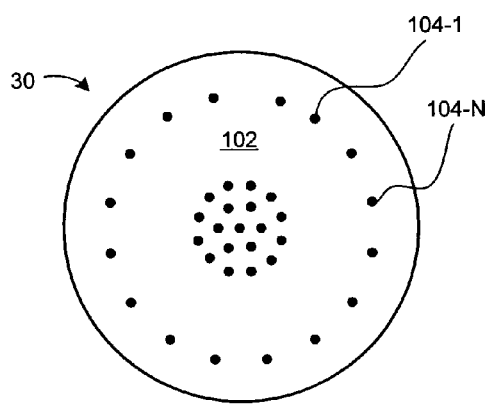
FIG. 3 is a diagram illustrating a mask for an insulating layer for covering the electrodes.

An insulating layer 102 having a number of holes 104-1 through 104-N is formed over the electro-restrictive material 50 and the electrodes 40. FIG. 3 illustrates a configuration of the insulating layer 102 and the holes 104. The insulating layer 102 covers at least a portion of the electrodes 40 and the electro-restrictive material 50, allowing for electrical connectivity from each electrode 40 to a perimeter region of the mirror 30. As shown FIG. 3, there is one hole 104 that corresponds to each electrode 40, exposing a portion of the electrode 40 for making an electrical connection thereto. In alternate embodiments, there could be more or less than one hole 104 for each electrode 40. Moreover, outer electrodes 40 that extend to a perimeter region of the mirror 30 may be left uncovered by the insulating layer 102, so there may be no holes 104 in the layer 102 needed for making an electrical connection to those electrodes 40. Moreover, the insulating layer 102 may cover only a portion of the electro-restrictive material 50 and electrodes 40 that is needed for making electrical connections from the electrodes 40 to a perimeter region of the mirror 30.

Figure 4:
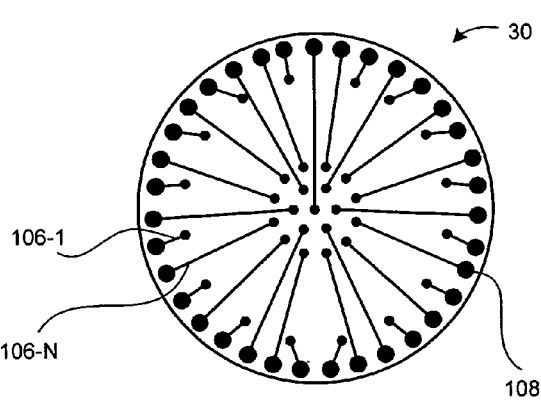
FIG. 4 is a diagram illustrating a mask for depositing conductive traces and connection points.
Figure 5:
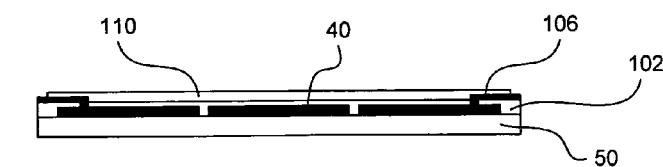
FIG. 5 is a side view of the electrodes above an electro-restrictive layer, with an insulating layer, traces, and connection points.

Over the insulating layer 102 are formed a number of conductive traces 106-1 through 106-N for electrically coupling the electrodes 40 to an external circuit. As shown in FIG. 4, each conductive trace 106 extends through a hole 104 to make electrical contact with an electrode 40 beneath the insulating layer 102. The traces 106 end at bonding pads 108 near the perimeter of the mirror. The bonding pads 108 allow for an easy and reliable electrical connection to each electrode 40 from an external circuit. FIG. 5 illustrates a side view of the mirror 30 having the traces 106 formed on the insulating layer 102 and making an electrical connection with the electrodes 40 on the electro-restrictive material 50.

Figure 6:
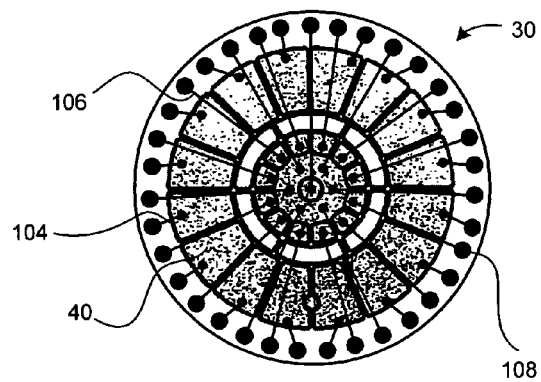
FIG. 6 is a diagram illustrating the relationship of the traces, connection points, and electrodes.

FIG. 6 illustrates how each electrode 40-1 through 40-N is connected by a trace 106 to a bonding pad 108 at the perimeter of the mirror 30. In FIG. 6, the insulating layer 102 is not shown to allow illustration of how each electrode is connected. Other patterns of connecting traces 106 may be used in other embodiments.

Figure 2:
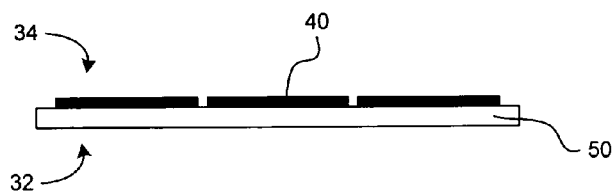
FIG. 2 is a side view of the electrodes above an electro-restrictive layer of a deformable mirror.

In one embodiment, the electrodes 40 are fabricated from a base layer of Cr covered by Au, although any of a number of conductive materials can be used in the electrodes 40. The electrodes 40 can be formed on the electro-restrictive layer 50 by any of a number of conventional techniques. In one embodiment, a mask is placed on the electro-restrictive material 50, the mask defining the desired pattern of electrodes 40 to be deposited. FIG. 1 shows an example mask for forming the electrodes 40. A conductive layer is then formed on the mask, which is stripped off the electro-restrictive material 50 to leave the electrodes 40. FIG. 2 shows a side view of the electrodes 40 above the layer of electro-restrictive material 50.

In one embodiment, the insulating layer 102 is a layer of $SiO_2$, although other materials could also be used. A mask, such a the mask shown in FIG. 3, is laid down over the electro-restrictive material 50 and electrodes 40, and the insulating layer 102 material is deposited on the mask. The additional insulating material is then removed to expose the electrodes 40 at the holes 104 in accordance with the mask.

Once the insulating layer 102 is formed, the traces 106 can be formed thereon. In one embodiment, a photoresistive layer is placed over the insulating layer 102 in a pattern for forming the conductive traces 106. FIG. 4 shows an example mask for this purpose. The traces 106 are then formed by evaporating a metal onto the surface and stripping the mask. Alternatively, any other conventional method of forming conductive traces on a surface may be used. FIG. 5 is a side view of the mirror 30 after the insulating layer 102 and traces 106 have been formed. As shown in the figure, the traces 106 extend from the perimeter of the mirror 30 over the insulating layer 102 and through a hole 104 in the insulating layer 102 to contact the electrodes 40.

To protect the traces 106 and other layers of the mirror 30 from damage, electrical shorting, and other environmental conditions, a protective coating 110 can be formed over the layers on the back surface 34 of the mirror 30. In one embodiment, the protective coating 110 is a high-dielectric paint or other depositable material having a high dielectric value. In additional to the mechanical protection afforded by the coating 110, the coating helps to shield the electrodes 40 and traces 106 from each other and from external sources of electric fields. So that the bonding pads 108 remain exposed for electrical connection, the pads 108 can be masked off before forming the protective coating 110.

By allowing each electrode 40 to be electrically connected at the bonding pads 108 at the perimeter of the mirror 30, the problems associated with making soldered wire connections to the electrodes 40 are avoided. The fields created by the electrical current in the traces 106 have substantially no effect on the electro-restrictive material, as the electro-restrictive material is shielded from the electric field by the electrodes 40. Because the bonding pads 108 are located at or near the perimeter of the mirror 30, connections to an external circuit can be easily made via wire bonding, clips, conducting epoxy, or even by mounting the mirror directly to a printed circuit board.

Figure 7:
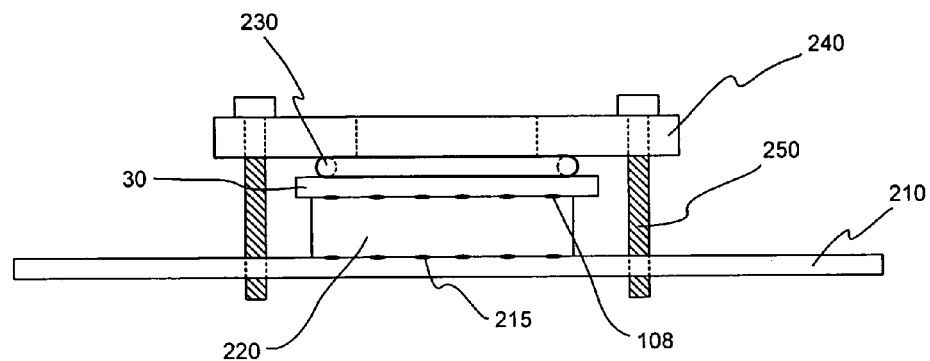
FIG. 7 is a diagram of aside view of a deformable mirror coupled to a circuit board for receiving electric potential therefrom.

FIG. 7 illustrates one method for mounting the deformable mirror 30 and electrically coupling it to a circuit board 210. As shown in this side view, the circuit board 210 includes a number of bonding pads 215 that are coupled to circuitry for providing electric signals to the electrodes 40 of the mirror 30 to deform it. The bonding pads 215 on the circuit board 210 correspond geometrically with the bonding pads 108 of the deformable mirror 30. Taking advantage of the ability of the bonding pads 108 of the mirror 30 to align with the bonding pads 215 of the circuit board 210, a strip connector 220 is used to connect electrically corresponding bonding pads of the two sets of pads 108 and 215. In this way, and electrical device coupled to the circuit board 210 can generate and apply appropriate voltages to the deformable mirror 30, causing it to deform as desired in an adaptive optics system.

The strip connector 220 can take a variety of forms. In one embodiment, the strip connector 220 is a zebra strip connector that is bent into the circular shape of the bonding pads 108 and 215 and pressed therebetween. A zebra strip conductor is a rubber material that consists of an insulating material with a large number of small conductors that run in parallel from one end of the strip to the other. The conductors inside the zebra strip, therefore, make an electrical connection from one end of the strip to the other, but they are electrically isolated from each other. The zebra strip connector is sandwiched between the mirror 30 and the circuit board 210, oriented so that the conductors inside the zebra strip run between the mirror 30 and the circuit board 210. Because the size of the conductors in the zebra strip is small compared to the diameter of the bonding pads 108 and 215, this configuration precisely couples each bonding pads 108 on the mirror 30 to its associated bonding pad 215 on the circuit board 210. Conductors within the zebra strip that do not align with a pair of bonding pads 108 and 215 are electrically isolated and are therefore not an operational part of the circuit.

As an alternative to using a zebra strip connector, other connectors such as flexible circuit boards can be used to couple the mirror 30 to the circuit board 210. In another embodiment, the mirror 30 is coupled directly to the circuit board 210 without the use of a strip connector 220.

To maintain good electrical contact between the mirror 30 and the circuit board 210, the strip conductor 220 is compressed therebetween. To provide an even compressive force, an o-ring 230 and a retaining plate are placed over the mirror 30 as shown in FIG. 7. The retaining plate has an open central region 245 so that light can travel past the plate 240 and the o-ring 230 to reflect off the mirror 30. As an alternative to an o-ring 230, another resilient material or one or more spring elements can be used to modulate the force applied by the retaining plate 240. To apply a force compressing the strip connector 220 between the mirror 30 and the circuit board 210, the retaining plate is mechanically coupled to the circuit board. In one embodiment, this compressive force is achieved by attaching the retaining plate 240 to the circuit board 210 by a plurality of screws 250, as shown. By pressing the mirror 30 against the circuit board 210, the strip connector 220 is maintained in good electrical contact with both sets of bonding pads 108 and 215. Another benefit of this configuration is that the perimeter of the mirror 30 is held firmly in place, leaving a central region to deform without mechanical interference from the mounting system.

Figure 8:
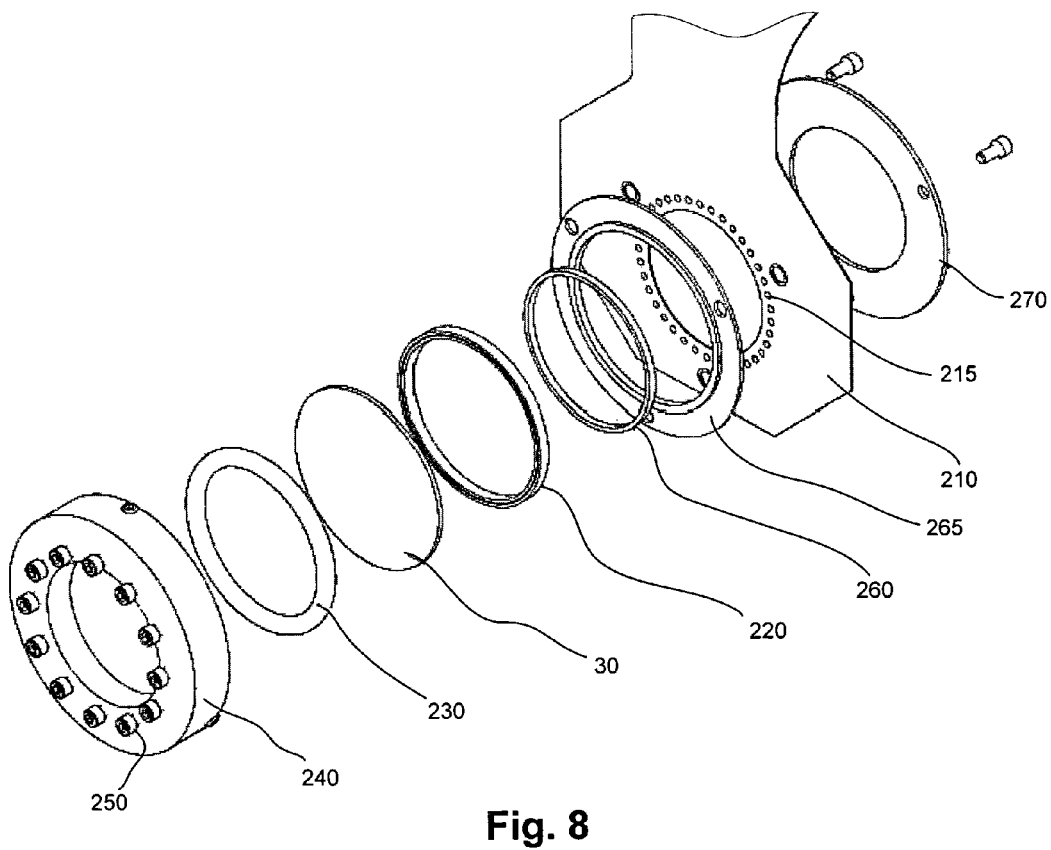
FIG. 8 is an assembly diagram for coupling a deformable mirror to a circuit board or other device.

FIG. 8 shows an assembly drawing of one implementation of the deformable mirror 30 mounted to a circuit board 210. The circuit board 210 includes a plurality of bonding pads 215, which receive signals to control the deformation of the mirror 30 from other components in the adaptive optics system (not shown). An inner retainer 260 and an outer retainer 265 are used to keep the strip connector 220 in place and aligned with the bonding pads 215 on the circuit board 210. The mirror 30 is then placed in contact with the strip connector 220 and is held in place with an o-ring 230 and retaining plate 240 as described above. A plate 270 can be used on the opposite side of the circuit board 210 to couple with the retaining plate 240 to avoid damaging the circuit board 210 due to the compressive force.

It can be appreciated that the bonding pads 108 on the mirror 30 correspond to particular electrodes 40, which in turn deform the mirror 30 in different ways. It is therefore important to orient the mirror 30 rotationally so that each bonding pads 108 on the mirror 30 is aligned with its corresponding bonding pad 215 on the circuit board 210. Otherwise, the wrong electrodes could be activated by the system, causing incorrect deformations in the mirror 30.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. An adaptive optics system comprising:
   a deformable mirror having a reflective surface and an opposing electrode surface, the electrode surface including a plurality of electrodes, the reflective surface configured to deform responsive to an electric potential on one or more of the electrodes;
   an insulating layer formed on the electrode surface of the deformable mirror, the insulating layer exposing at least a portion of the electrodes; and
   a plurality of conductive traces formed on the insulating layer, each conductive trace coupling an electrode to a perimeter region of the deformable mirror.

2. The system of claim 1, wherein the deformable mirror comprises an electro-restrictive material that deforms responsive to an electrical field caused by an electric potential on one or more of the electrodes.

3. The system of claim 1, wherein the deformable mirror comprises a piezoelectric material that deforms responsive to an electrical field caused by an electric potential on one or more of the electrodes.

4. The system of claim 1, wherein each conductive trace is coupled to a bonding pad at the perimeter region of the mirror.

5. The system of claim 1, further comprising:
   a protective coating covering at least a portion of the conductive traces.

6. The system of claim 5, wherein the protective coating comprises a dielectric material.

7. The system of claim 1, wherein the perimeter region of the mirror corresponds to an edge of the mirror.

8. The system of claim 1, further comprising:
   a circuit board having plurality of conductors thereon, each of the conductors for providing an electric potential to an electrode for deforming the deformable mirror; and
   a strip connector coupled between the circuit board and the deformable mirror, the strip connector including a plurality of conductors for electrically coupling the conductors on the circuit board to corresponding conductive traces on the insulating layer of the deformable mirror.

9. The system of claim 8, wherein the strip connector is a zebra strip connector.

10. The system of claim 8, wherein:
    each conductive trace is coupled to a bonding pad, the bonding pads of the mirror forming a generally circular pattern at the perimeter region of the mirror, and
    the circuit board further includes a plurality of bonding pads coupled to the conductors on the circuit board, the bonding pads of the circuit board forming a generally circular pattern and corresponding to the bonding pads of the mirror.

11. The system of claim 8, further comprising:
    a retaining plate mechanically coupled to the circuit board for providing a compressive force on the strip connector between the deformable mirror and the circuit board; and
    a resilient element disposed between the deformable mirror and the retaining plate for modulating the compressive force.

12. A deformable mirror for an adaptive optics system, the mirror comprising:
    a reflective surface having a central region for receiving light;
    an electro-restrictive material configured to deform responsive to an electric potential, wherein a deformation of the electro-restrictive material causes the reflective surface to deform;
    a plurality of electrodes coupled to the electro-restrictive material, each electrode for providing an electrical potential to a portion of the electro-restrictive material; and
    a plurality of conductive traces, each conductive trace electrically coupling an electrode to a perimeter region of the deformable mirror, at least a portion of some of the conductive traces shielded from the electro-restrictive material by the electrodes.

13. The deformable mirror of claim 12, wherein the perimeter region of the deformable mirror corresponds to a physical edge of the deformable mirror.

14. The deformable mirror of claim 12, wherein the perimeter region of the deformable mirror corresponds to a region of the deformable mirror that does not substantially deform.

15. The deformable mirror of claim 12, wherein the perimeter region of the deformable mirror is an area of the deformable mirror outside the placement of the electrodes.

16. The deformable mirror of claim 12, further comprising:
    an insulating layer over the electrodes and exposing at least a portion of each electrode, wherein each electrical conductor is a conductive trace formed on the insulating layer.

17. The deformable mirror of claim 16, wherein each conductive trace leads to a bonding pad in perimeter region of the deformable mirror.

18. A method of manufacturing a deformable mirror for an adaptive optics system, the method comprising:
    providing a deformable mirror having a reflective surface on a front surface of the deformable mirror;
    forming an electrode surface on a back surface of the deformable mirror, the electrode surface including a plurality of electrodes, the reflective surface configured to deform responsive to an electric potential on one or more of the electrodes;

forming an insulating layer on the electrode surface of the deformable mirror, the insulating layer exposing at least a portion of the electrodes; and forming a plurality of conductive traces on the insulating layer, each conductive trace coupling an electrode to a perimeter region of the deformable mirror.

19. The method of claim 18, wherein:

forming the electrode surface comprises:

masking an electrode pattern on a back surface of the deformable mirror, the electrode pattern defining a plurality of electrode segments;

depositing a conductive layer on the back surface to form the plurality of electrode segments;

forming the insulating layer on the electrode surface comprises:

masking an insulator pattern over the electrode segments, the insulator pattern exposing at least a portion of each electrode segment;

depositing an insulating material over the electrode segments according to the insulator pattern; and forming the conductive traces on the insulating layer comprises:

masking a trace pattern for defining a plurality of connections, each connection from an exposed location of an electrode segment to a location in a perimeter region of the deformable mirror;

depositing conductive material to form a plurality of conductive traces according to the trace pattern.

20. The method of claim 19, wherein the insulator pattern includes at least one hole for each electrode segment, the hole for exposing the electrode segment.

21. The method of claim 19, wherein the trace pattern further defines a bonding pad in a perimeter region of the deformable mirror for each conductive trace.

22. The method of claim 19, further comprising:

applying a protective coating over at least a portion of the conductive traces.

23. The method of claim 22, wherein protective coating comprises a dielectric material.

24. The method of claim 19, further comprising:

electrically coupling the deformable mirror to a circuit board so that each of the conductive traces on the mirror is coupled to a corresponding conductor on the circuit board, the circuit board for providing electrical potential to the conductive traces.

25. The method of claim 24, wherein the deformable mirror is coupled to the circuit board using a strip connector.

26. The method of claim 25, wherein the strip connector is a zebra strip connector.

27. The method of claim 24, further comprising:

securing the deformable mirror in electrical connection with the circuit board with a retaining plate, the retaining plate providing a compressive force between the deformable mirror and the circuit board.

28. The method of claim 27, further comprising:

disposing a resilient element between the deformable mirror and the retaining plate for modulating the compressive force.

* * * * *